(12) United States Patent
Albersmeyer

(10) Patent No.: US 12,629,991 B2
(45) Date of Patent: May 19, 2026

(54) DEVICE AND METHOD FOR PRODUCING A ROLLER BLIND WEB

(71) Applicant: Webasto SE, Stockdorf (DE)

(72) Inventor: Nathalie Albersmeyer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 335 days.

(21) Appl. No.: 18/271,171

(22) PCT Filed: Jan. 13, 2022

(86) PCT No.: PCT/EP2022/050642
§ 371 (c)(1),
(2) Date: Jul. 6, 2023

(87) PCT Pub. No.: WO2022/152791
PCT Pub. Date: Jul. 21, 2022

(65) Prior Publication Data
US 2024/0051374 A1 Feb. 15, 2024

(30) Foreign Application Priority Data
Jan. 15, 2021 (DE) ..................... 10 2021 100 723.2

(51) Int. Cl.
*B60J 1/20* (2006.01)
*B05D 1/26* (2006.01)
(52) U.S. Cl.
CPC ............ *B60J 1/2041* (2013.01); *B05D 1/265* (2013.01)
(58) Field of Classification Search
CPC ................................ B60J 1/2041; B05D 1/265
USPC ........................................................ 296/97.8
See application file for complete search history.

(56) References Cited

U.S. PATENT DOCUMENTS

| | | | | |
|---|---|---|---|---|
| 3,017,927 A | * | 1/1962 | Demko | .................. E06B 9/582 160/271 |
| 10,132,117 B2 | * | 11/2018 | Munsters | ................. E06B 9/42 |
| 2009/0056100 A1 | | 3/2009 | Jakobi | |
| 2009/0145559 A1 | * | 6/2009 | Glasl | ..................... B60J 1/2041 160/273.1 |
| 2009/0178771 A1 | * | 7/2009 | Lin | ........................ B60J 7/0015 160/370.22 |
| 2014/0096897 A1 | | 4/2014 | Katou | |

(Continued)

FOREIGN PATENT DOCUMENTS

| | | | |
|---|---|---|---|
| DE | 102010054195 A1 | 6/2012 |
| DE | 102015109279 A1 | 12/2016 |
| DE | 102017000460 A1 | 3/2018 |

(Continued)

OTHER PUBLICATIONS

International Search Report from PCT/EP2022/050642; mailed May 13, 2022 In German with English Translation ( 5 pages).

(Continued)

*Primary Examiner* — Taras P Bemko
(74) *Attorney, Agent, or Firm* — Fitch, Even, Tabin & Flannery, LLP

(57) ABSTRACT

A device for producing a roller blind web of a motor vehicle, the device having an application table having a continuously flat support surface for a fabric; and an extruder configured to apply a plastic material to the fabric from above along at least one extrusion track. A tensioner tensions the fabric in the direction of the extrusion track. Moreover, a method for producing a roller blind web is provided.

10 Claims, 3 Drawing Sheets

(56)          References Cited

U.S. PATENT DOCUMENTS

2018/0178638  A1      6/2018  Wimmer
2022/0080812  A1      3/2022  Sterl

FOREIGN PATENT DOCUMENTS

DE      102019102339  A1      7/2020
EP          2030822  A1      3/2009

OTHER PUBLICATIONS

Office Action issued against corresponding German Application No. 10 2021 100 723.2; mailed Oct. 10, 2023 In German with English Translation (10 pages). Note: German Refs: DE 10 2017 000 460 A1; DE 10 2010 054 195 A1 and DE 10 2015 109 279 A1 cited in a previous IDS for the present application.
Office Action issued in corresponding German Application: DE 102021100723.2; mailed Dec. 8, 2025; in German with English machine translation (8 pages).

* cited by examiner

DEVICE AND METHOD FOR PRODUCING A ROLLER BLIND WEB

CROSS-REFERENCE TO RELATED APPLICATIONS

This application is a U.S. national phase application filed under 35 U.S.C. § 371 of International Application No. PCT/EP2022/050642, filed on Jan. 13, 2022, published under WO 2022/152791 on Jul. 21, 2022, designating the United States, which claims priority from German Patent Application Number 10 2021 100 723.2, filed on Jan. 15, 2021, which are hereby incorporated herein by reference in their entirety for all purposes.

FIELD

The invention relates to a device for producing a roller blind web of a motor vehicle, the device comprising the features of the preamble of patent claim 1, and to a method for producing a roller blind web of a motor vehicle.

BACKGROUND

A device of this kind is known from DE 10 2015 109 279 A1 and can be used for producing a roller blind web which is part of a shading system of a motor vehicle. For this purpose, the device comprises an application table, which has a flat support surface for a fabric, and an extruder, which is configured to apply a plastic material to the fabric from above along at least one extrusion track. The applied plastic material, whose course follows the extrusion track, forms a lateral guide strip of the resulting roller blind web, which can be guided in a lateral guide rail of the shading system when the roller blind web is in the installation position. During the extrusion process, the plastic material is applied to the fabric in hot and flowable form. During subsequent cooling and solidification, the plastic shrinks in a range between 0.5% and 4%. This causes the fabric to wrinkle.

SUMMARY

The object underlying the invention is to provide a device and a method for producing a roller blind web of a motor vehicle in which a plastic material is applied along an extrusion track from above according to an extrusion process and the risk of wrinkling of the fabric due to shrinkage of the plastic material is reduced.

According to the invention, this object is attained by the device having the features of claim 1 and by the method having the features of claim 7.

According to the invention, a device for producing a roller blind web of a motor vehicle is thus proposed, the device comprising an application table, which has a flat support surface for a fabric, and an extruder, which is configured to apply a plastic material in flowable form to the fabric along an extrusion track from above. A tensioner tensions the fabric in the direction of the extrusion track and at least partially limits the fabric at its edges. In particular, the tensioner tensions the fabric in the direction following the extrusion track.

The tensioner makes it possible to tension or stretch the fabric by a certain amount before applying the plastic material in accordance with its course on the fabric. After the plastic material has been applied and solidified, the tensioner can be detached from the fabric so that its tension or stretch is released. Shrinkage of the plastic material due to the cooling and solidification process after the extrusion by means of the extruder thus does not lead to wrinkling of the fabric. Instead, the fabric can still lie least approximately flat on the application table. The tensioner pre-stretches the fabric before the plastic material, by means of which a lateral guide strip or an edge piping for connecting a pull bar is formed, for example, is applied.

The tensioner preferably comprises a tensioning frame, which is compactly disposed at the application table as a unit. The tensioning frame can be brought in contact with the fabric in a simple manner, which enables short cycle times in series production of the roller blind web.

The size of the application table and also of the tensioning frame can be adjusted in a modular manner. Thus, roller blind webs with different dimensions can be produced by means of the same application table and the same tensioning frame.

In a preferred embodiment of the device according to the invention, the tensioning frame comprises a base frame and tensioning elements engaging the fabric in a force-fitting manner. The base frame preferably limits the fabric circumferentially. The tensioning elements, which are advantageously mounted on the base frame, grip the fabric in order to tension or stretch it in the desired direction, i.e., following the extrusion track.

In a particular embodiment of the device according to the invention, the tensioning elements are configured to be shifted relative to the base frame so as to tension the fabric. Thus, it is possible for the tensioning elements to first grip the fabric and then tension or stretch it by shifting outwards in the desired direction.

In order to be able to introduce the tension into the fabric in a targeted manner, the tensioning elements are preferably disposed in pairs on opposite legs of the base frame.

In particular, the base frame comprises two longitudinal legs and two transverse legs, the tensioning elements being disposed opposite each other on the two longitudinal legs on the one hand and opposite one another on the transverse legs on the other. Thus, it is possible to tension or stretch the fabric parallel to the transverse legs by means of the tensioning elements disposed on the longitudinal legs on the one hand and to tension or stretch the fabric parallel to the longitudinal legs by means of the tensioning elements disposed on the transverse legs on the other hand.

In a special embodiment, the tensioning elements are in contact with the piece of fabric from above. This allows the fabric to lie flat along its entire length. The tensioning elements pull the fabric in the direction of the associated leg of the base frame.

The method according to the invention for producing a roller blind web of a motor vehicle comprises the following steps:

placing a fabric on an application table, the fabric lying flat;

tensioning or stretching the fabric by means of a tensioner disposed at the application table;

applying a plastic material to the fabric along an extrusion track extending at least essentially in a tensioning direction defined by the tensioner; and releasing the tension or stretch of the fabric applied by the tensioner.

In 3D-printing-type molding of plastic material along an extrusion track extending in the transverse direction of the fabric and along an extrusion track extending in the longitudinal direction of the fabric, the fabric is preferably tensioned or stretched in the transverse direction and in the longitudinal direction by means of the tensioner. The extrusion tracks represent the course of the applied plastic material on the fabric.

The plastic material applied or molded on is preferably a thermoplastic elastomer (TPE), which can have a high Shore hardness.

The tensioner preferably comprises a tensioning frame, which can be disposed at the application table as a unit.

In an advantageous embodiment of the method according to the invention, the tensioning or stretching in the two directions is carried out sequentially, for example in such a way that the fabric is first tensioned or stretched in the longitudinal direction and then provided with the plastic material along a first extrusion track, which extends in the longitudinal direction. After cooling and solidification of the plastic material, the tension running in the longitudinal direction is released. Subsequently, the fabric is tensioned or stretched in the transverse direction and provided with the plastic material along a second extrusion track, which runs in the transverse direction. After the plastic material has cooled and solidified, the tension in the transverse direction can also be released. The result is a wrinkle-free fabric which, together with the strip-like thickenings of the applied plastic material which have been applied along the extrusion tracks, can be used as a roller blind web.

In a particular embodiment of the method according to the invention, the application of the plastic material forms a guide tape for laterally guiding the roller blind web on the fabric. In addition, an edge piping for connecting a pull bar to the fabric can be formed in a second direction by applying further plastic material. Both the guide tape and the edge piping represent a strip-like thickening formed by the applied plastic material.

Other advantages and advantageous configurations of the subject matter of the invention are apparent from the description, the drawing and the claims.

BRIEF DESCRIPTIONS OF THE DRAWINGS

An exemplary embodiment of a device according to the invention is schematically illustrated in the drawing and is explained in more detail in the following description.

DETAILED DESCRIPTION

Figure 1:
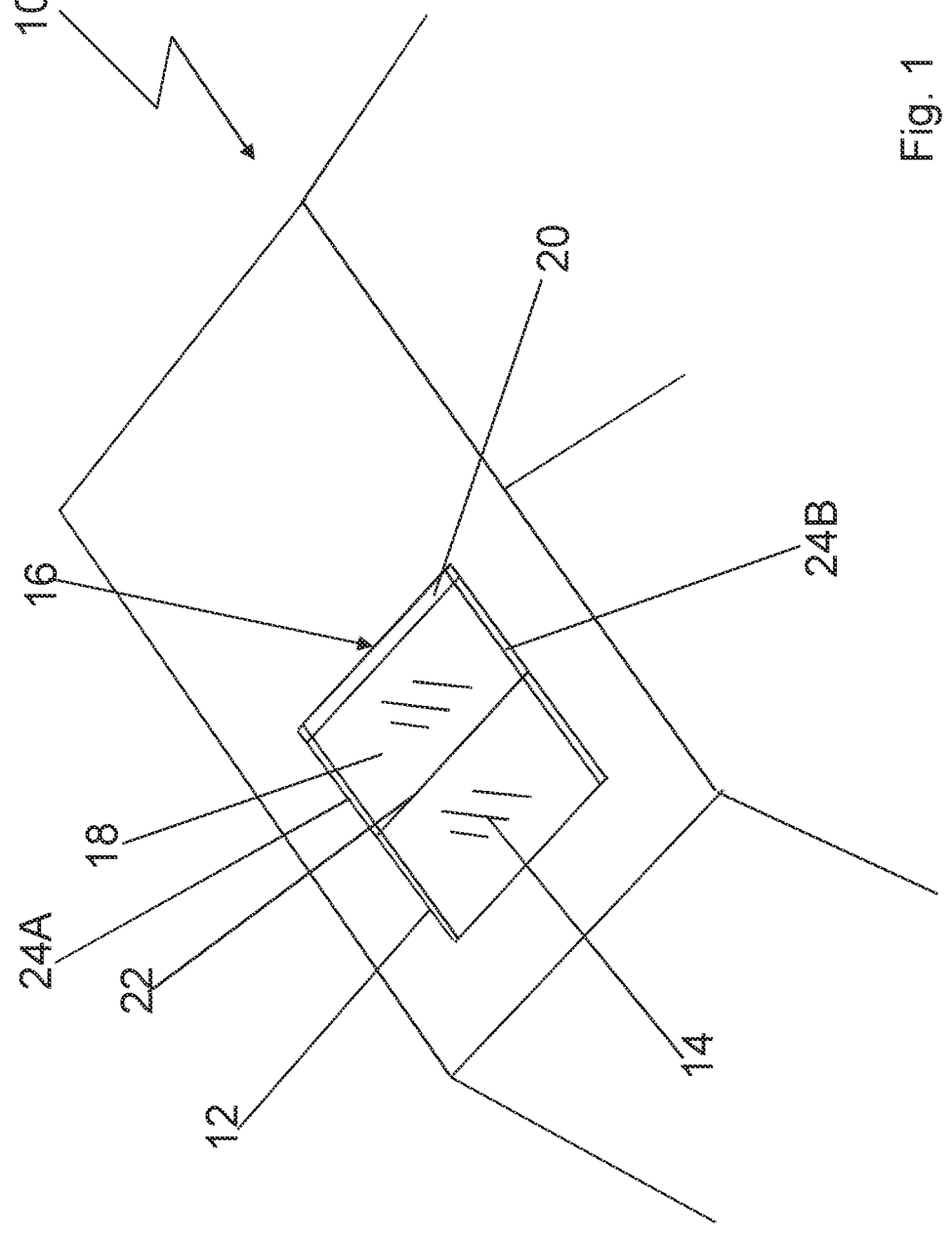
FIG. 1 is a perspective top view of a vehicle roof with a roller blind assembly comprising a roller blind web produced according to the invention.

FIG. 1 shows a vehicle roof 10 having a roof opening 12 which can be selectively closed or opened by means of a roof opening system comprising a transparent cover element 14 made of glass. For shading the roof opening 12, the vehicle roof 10 comprises a roller blind assembly 16 comprising a roller blind web 18 which can be wound onto a winding shaft 20 disposed at the rear edge of the roof opening 12 and extending in the transverse roof direction. At its edge facing away from the winding shaft 20 and extending in the transverse roof direction, the roller blind web 18 is provided with a pull bar 22, the ends of which are guided in guide rails 24A and 24B, respectively, which are fixed to the roof.

In order to also be able to keep the roller blind web 18 tensioned in the transverse roof direction when it is unwound from the winding shaft 20, it has guide tapes 26A and 26B, respectively, at its lateral edges, which are guided in corresponding guide tracks of guide rails 24A and 24B, respectively. To form the pull bar 22, the roller blind web 18 has an edge piping 58.

Figure 2:
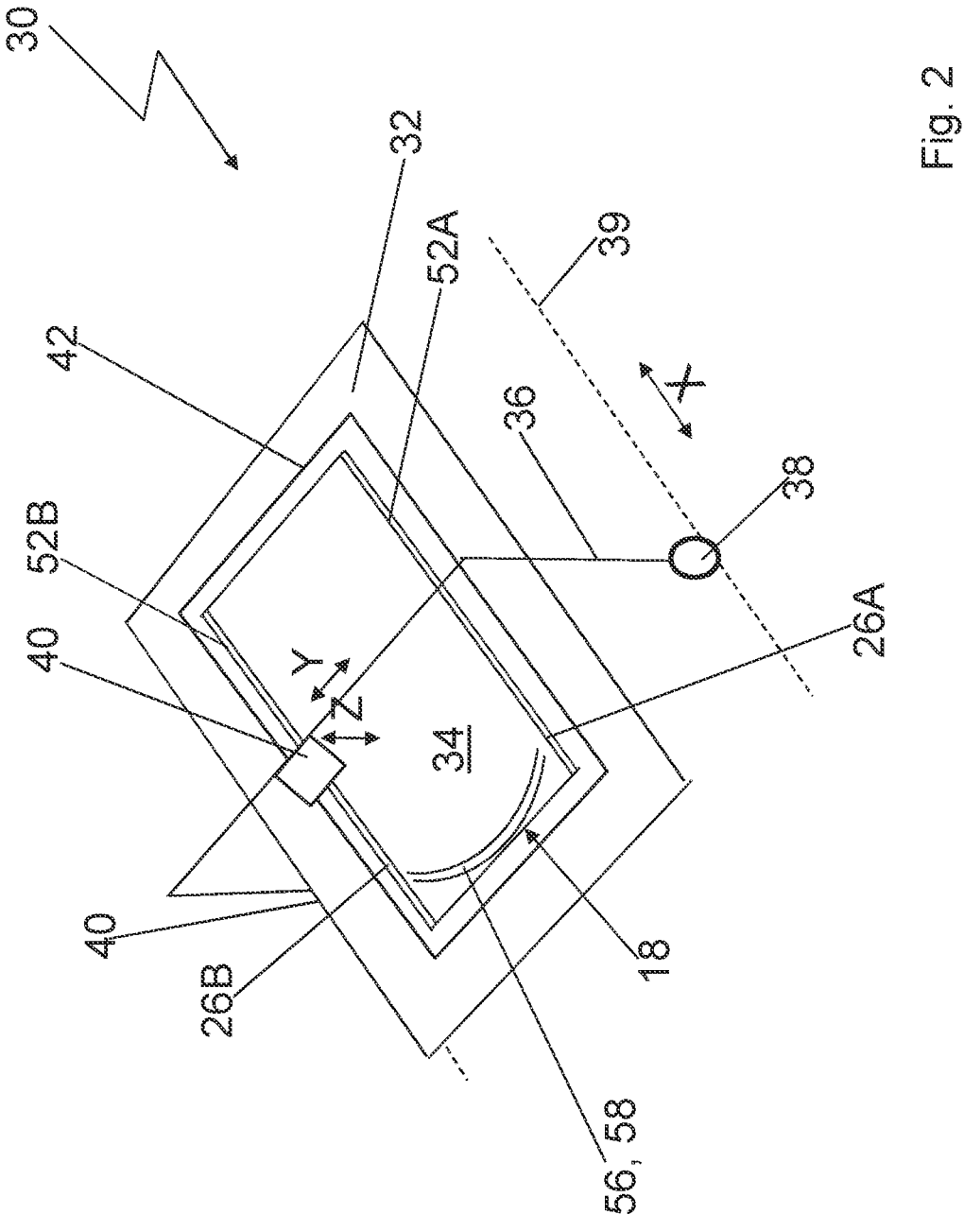
FIG. 2 is a perspective view of a device for producing the roller blind web.
Figure 3:
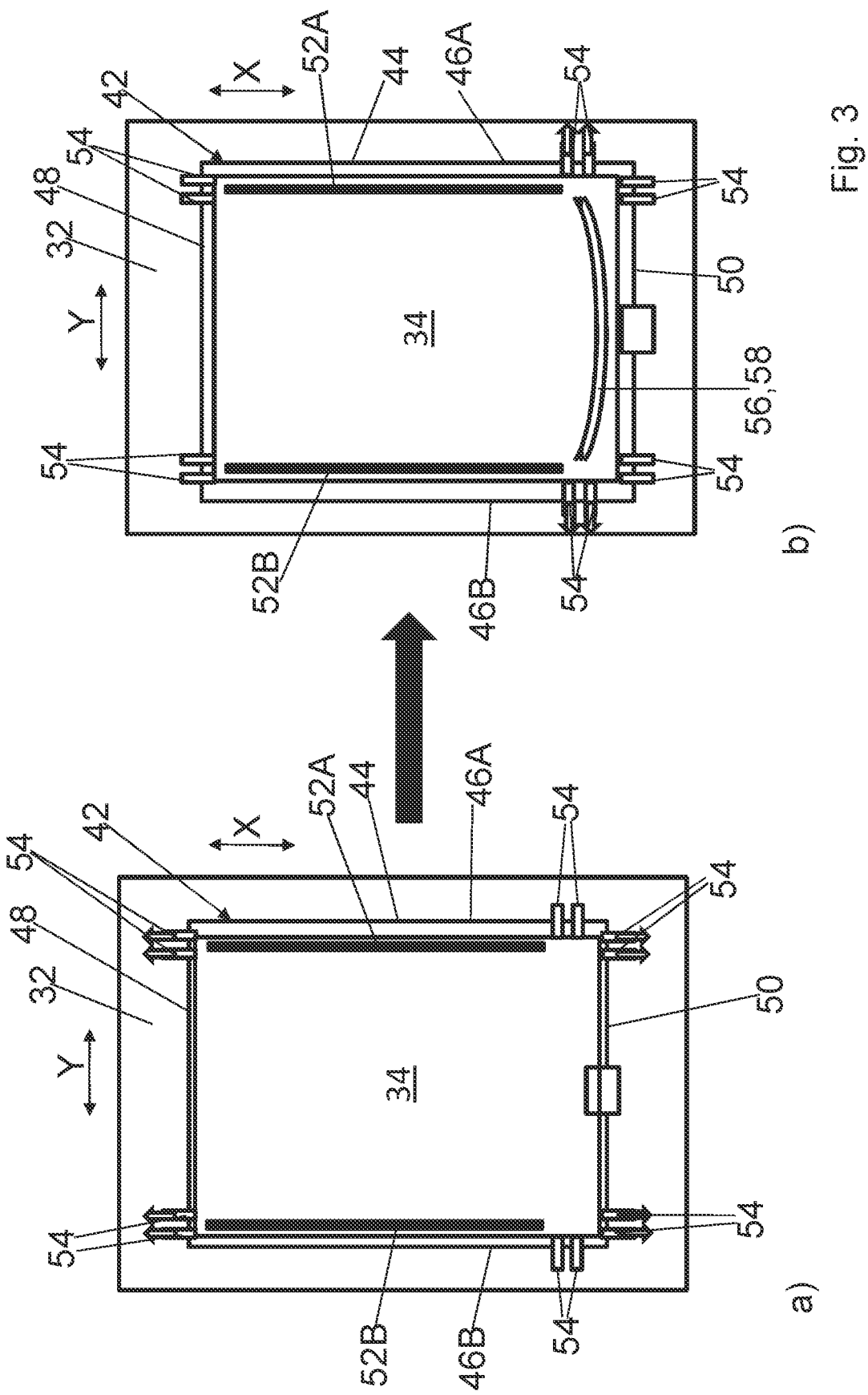
FIGS. 3a and b are top views of an application table of the device during sequential tensioning of a piece of fabric.

The roller blind web 18 is produced using a device 30 shown in a highly schematic manner in FIGS. 2 and 3a and 3b. The device 30 comprises an application table 32 which forms a planar support surface for a piece of fabric 34 which thus lies flat on the application table 32 in a defined orientation.

The device 30 for producing the roller blind web 18 further comprises a portal 36 as a support device, which can be moved on rails 39 in the X-direction, i.e., the longitudinal direction, of the piece of fabric 34 by means of a drive motor 38. An extrusion head 40, by means of which a plastic material can be applied to the upper side of the piece of fabric 34, is attached to the portal 36. The extrusion head 40 is movable on the portal 36 in the Y-direction, i.e., the transverse direction, of the piece of fabric 34. Moreover, the extrusion head 40 can be shifted relative to the portal 36 in the Z-direction, i.e., the vertical direction.

As shown in FIGS. 2, 3a and 3b in particular, the device 30 is provided with a tensioning frame 42 disposed at the top of the application table 32 and serving to tension or stretch the piece of fabric 34 in the X-direction and in the Y-direction. The tensioning frame 42 comprises a base frame 44 having two longitudinal legs 46A and 46B, which extend in the X-direction, and two transverse legs 48 and 50, which extend in the Y-direction. In extension to two extrusion tracks 52A and 52B, which define the travel path of the extrusion head 40, according to which the guide tapes 26A and 26B are formed on the piece of fabric 34 by means of the extrusion head 40 by moving the portal 36 in the X-direction, tensioning elements 54 are disposed on each of the transverse legs 48 and 50; the tensioning elements 54 can be brought into engagement with the piece of fabric 34 by coming into full contact with it and are displaceable relative to the base frame 44 in the X-direction. Two tensioning elements 54 are disposed on each of the longitudinal legs 46A and 46B of the base frame 44 in extension to an extrusion track 56, which defines the course of the edge piping 58; the tensioning elements 54 can also be brought into engagement with the piece of fabric 34 and can be displaced in the Y-direction relative to the base frame 44.

To produce the roller blind web 18, the piece of fabric 34 is first placed on the application table 32 in such a manner that it lies flat. Then the piece of fabric 34 is tensioned in the X-direction by means of the tensioning frame 42. For this purpose, the tensioning elements 54 disposed on the transverse legs 48 and 50 are brought into engagement with the piece of fabric and then shifted outward relative to the base frame 44 and secured. The piece of fabric 34 is thus tensioned or stretched in the X-direction, in particular in the area of the extrusion tracks 52A and 52B (FIG. 3a). The guide tapes 26A and 26B are then formed. For this purpose, the extrusion head 40 is moved along the extrusion tracks 52A and 52B by moving the portal 36 in the X-direction while simultaneously extruding a plastic material, such as a TPE (thermoplastic elastomer) or a polyurethane material, and applying it to the upper side of the piece of fabric 34. After the plastic material has solidified, the piece of fabric 34 is relaxed by shifting the tensioning elements 54 disposed on the transverse legs 48 and 50. Subsequently, the piece of fabric 34 is tensioned or stretched in the Y-direction in the area of the extrusion track 56 by means of the tensioning elements 54 disposed on the longitudinal legs 46A and 46B of the base frame 44, whereupon plastic material is applied to the piece of fabric 34 along the extrusion track 56 by means of the extrusion head 40 (FIG. 3*b*). This plastic material then forms the edge piping 58, via which the pull bar 22 can be attached to the roller blind web 18. To form the edge piping 58, the extrusion head 40 is moved on the portal 36 in the Y-direction, i.e., the transverse direction. A curvature can be achieved by simultaneously moving the portal 36 in the X-direction. After solidification of the plastic material of the edge piping 58, the tension in the Y-direction is released by shifting the tensioning elements 54 disposed on the longitudinal legs 46A and 46B. The piece of fabric 34 with the guide tapes 26A and 26B formed thereon and the edge piping 58 formed thereon can then be removed from the application table 32 for further use as a roller blind web 18.

The invention claimed is:

1. A device for producing a roller blind web of a motor vehicle, the device comprising: an application table having a flat support surface for a fabric; and an extruder configured to apply a plastic material to the fabric from above along at least one extrusion track, the device having a tensioner for tensioning the fabric in a direction following the extrusion track;
    wherein the tensioner comprises a tensioning frame which at least partially limits the fabric at its edges; and
    wherein the tensioning frame comprises a base frame and tensioning elements engaging the fabric in a force-fitting manner.

2. The device according to claim 1, wherein the tensioning elements are configured to be shifted relative to the base frame so as to tension the fabric.

3. The device according to claim 1, wherein the tensioning elements are disposed in pairs on opposite legs of the base frame.

4. The device according to claim 1, wherein the tensioning elements are in contact with the fabric from above and pull the fabric in the direction of an associated leg of the base frame.

5. The device according to claim 1, wherein the base frame comprises two longitudinal legs and two transverse legs, and the tensioning elements are disposed opposite each other on the two longitudinal legs and opposite each other on the two transverse legs.

6. A method for producing a roller blind web of a motor vehicle, the method comprising the steps of: placing a fabric on an application table, the fabric lying flat; tensioning the fabric by a tensioner disposed at the application table; applying a plastic material to the fabric along an extrusion track extending at least essentially in the tensioning direction defined by the tensioner; and releasing the tension of the fabric applied by the tensioner, and
    wherein the fabric is tensioned in the longitudinal direction and then provided with the plastic material along a first extrusion track, which runs in the longitudinal direction, and the tension running in the longitudinal direction is subsequently released, whereupon the fabric is tensioned in the transverse direction and provided with the plastic material along a second extrusion track, which runs in the transverse direction.

7. The method according to claim 6, wherein the tensioner tensions the fabric in a longitudinal direction and/or in a transverse direction.

8. The method according to claim 6, wherein the tensioner comprises a tensioning frame.

9. The method according to claim 6, wherein a guide tape for laterally guiding the roller blind web is formed on the fabric by applying the plastic material.

10. The method according to claim 6, wherein an edge piping of the roller blind web for connecting a pull bar is formed on the fabric by applying the plastic material.

* * * * *